(12) United States Patent
Palanciuc et al.

(10) Patent No.: US 10,497,023 B2
(45) Date of Patent: Dec. 3, 2019

(54) GENERATING PERSISTENT PROFILE IDENTIFIERS

(71) Applicant: Adobe Inc., San Jose, CA (US)

(72) Inventors: Virgil-Artimon Palanciuc, Bucharest (RO); Charles Menguy, New York, NY (US); Catalin Costache, Bucharest (RO)

(73) Assignee: Adobe Inc., San Jose, CA (US)

( * ) Notice: Subject to any disclaimer, the term of this patent is extended or adjusted under 35 U.S.C. 154(b) by 858 days.

(21) Appl. No.: 14/874,382

(22) Filed: Oct. 2, 2015

(65) Prior Publication Data

US 2017/0098245 A1   Apr. 6, 2017

(51) Int. Cl.
*G06Q 30/02* (2012.01)
*H04L 12/26* (2006.01)
*G06F 17/30* (2006.01)
*H04L 29/08* (2006.01)
*G06F 16/28* (2019.01)

(52) U.S. Cl.
CPC ....... *G06Q 30/0266* (2013.01); *G06F 16/285* (2019.01); *H04L 67/22* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2005/0289071 A1* | 12/2005 | Goin | ..................... | G06F 11/008 705/56 |
| 2009/0327333 A1* | 12/2009 | Diener | ................... | H04W 16/14 |
| 2011/0137774 A1* | 6/2011 | Jakilinki | ................ | G06Q 30/04 705/34 |
| 2013/0124309 A1* | 5/2013 | Traasdahl | ............... | H04L 67/22 705/14.49 |
| 2014/0066028 A1* | 3/2014 | Miller | .................... | H04W 64/00 455/414.1 |
| 2016/0224901 A1* | 8/2016 | Scarr | ........................ | H04L 67/22 |
| 2016/0275545 A1* | 9/2016 | Dasdan | .............. | G06Q 30/0244 |

(Continued)

OTHER PUBLICATIONS

Reconsideration about Clustering Analysis, Chengning Zhang et al. Jun. 1, 2015, 2015 IEEE 10th Conference on Industrial Electronics and Applications (ICIEA) (pp. 1517-1524) (Year: 2015).*

(Continued)

*Primary Examiner* — Aaron N Strange
*Assistant Examiner* — Mohammad Yousuf A. Mian
(74) *Attorney, Agent, or Firm* — Shook, Hardy and Bacon, L.L.P.

(57) ABSTRACT

Persistent profile identifiers can be produced to identify clusters of devices accessing a network in different time periods. In one embodiment, an apparatus uses a first identifier from a first group of identifiers to identify a first cluster of devices and uses a second identifier from a second group of identifiers to identify a second cluster of devices. Further, the apparatus determines that the first cluster of devices identified by the first identifier and the second cluster of devices identified by the second identifier form an edge in a maximum cluster matching. The apparatus provides the first identifier as a persistent identifier for the first cluster of devices and the second cluster of devices.

20 Claims, 8 Drawing Sheets

(56) References Cited

U.S. PATENT DOCUMENTS

2016/0323239 A1* 11/2016 Cheng .................... G06Q 30/02
2017/0200196 A1* 7/2017 Hartzell .................. H04W 4/21

OTHER PUBLICATIONS

Zaki, M. (Oct. 2012). Clustering Validation. In Data Mining and Analysis: Fundamental Concepts and Algorithms. Cambridge University Press. Retrieved Apr. 11, 2018 from the internet at <https://web.archive.org/web/20150701191005/http://www.cs.rpi.edu/~zaki/www-new/uploads/Dmcourse/Main/chap18.pdf>. 39 pages.

* cited by examiner

GENERATING PERSISTENT PROFILE IDENTIFIERS

BACKGROUND

Digital marketing includes the targeted, measurable, and interactive marketing of products or services using digital technologies to reach and convert leads into customers. Digital marketing can promote brands, build preference, and increase sales through various digital marketing techniques. As part of their marketing efforts, digital marketers often wish to identify customers. Thus, identifying a customer association with a device or set of devices, and not just identifying the device or set of devices independently, is important in digital marketing to consistently target, measure, and interact with the identified customer based on the customer's association with the device or set of devices.

While conventional digital marketing tools support identifying devices and tracking device activity, the tools are limited when it comes to identifying associations between a customer and a device or a customer and a set of devices. By way of example, conventional digital marketing tools are deficient in identifying customer-device associations over extended periods of time. In operation, conventional digital marketing tools only implement "snapshots in time" solutions, in which associations between customers and devices or sets of devices are determined only for short periods of time. For example, customer-device associations usually are determined only for a period while the customer is logged on a website or only when the customer is browsing from a particular location. As such, currently, customer-device associations are unstable over periods of time and unstable associations do not adequately support implementing digital marketing strategies.

In addition, existing clustering algorithms that could be used to support identifying customer-device associations are deficient when applied to large data systems supporting rich customer and device data. In particular, existing clustering algorithms include high computational complexity, which makes conventional solutions impractical for use with large and complex datasets. As a result, existing clustering algorithms result in less scalable and less efficient implementations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
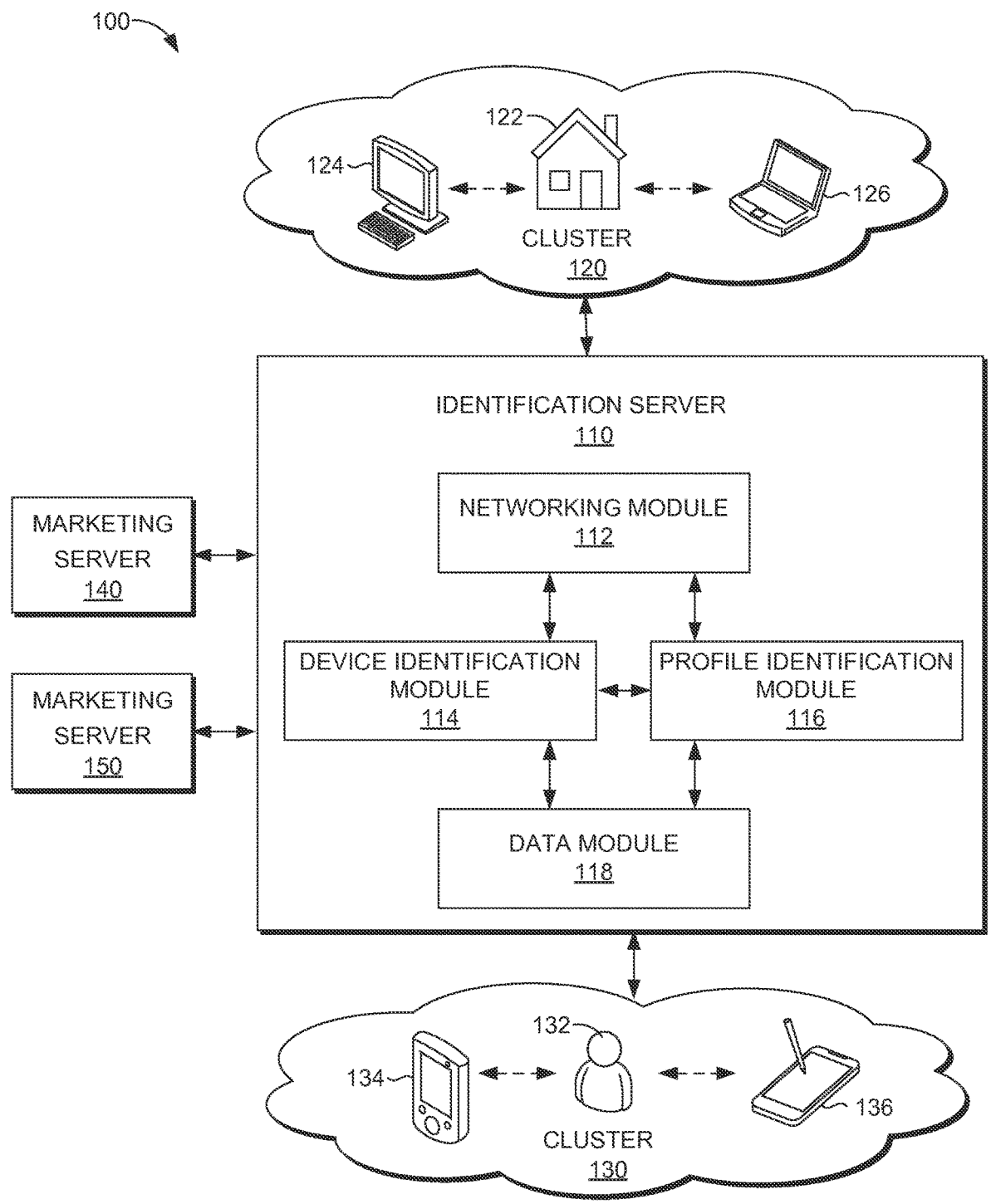
FIG. 1 is a schematic diagram illustrating an example system configuration for producing and using persistent profile identifiers, incorporating aspects of the present disclosure, in accordance with various embodiments.

Embodiments of the present invention are directed to assigning a persistent profile identifier to a set of devices likely to belong to the same user, household, or other entity. The persistent profile identifier is assigned by preserving the maximum-matching identifiers of the previous run when assigning profile identifiers to various devices during a current run, in operation, a clustering algorithm is employed at a first time to cluster devices, and a unique profile identifier is assigned to each set of devices (i.e., each device cluster). At a subsequent second time, the devices are again clustered, and different profile identifiers are temporarily assigned to each set of devices from that clustering. The profile identifiers and their assigned devices from the first time are compared with the profile identifiers and their assigned devices from the second time to identify maximum-matching identifiers, and the profile identifiers from the second time are replaced with matching profile identifier from the first time. This ensures that the profile identifiers remain stable in time. The various profile identifiers and their corresponding device clusters may be used to develop user-device graphs, household-device graphs, or entity-device graphs to support digital marketing and other types of identifier-based services.

Additionally, embodiments of the present invention provide an approach for maximum cluster matching that is able to process very large and complex datasets. Generally, known methods for maximum-weight match have complexities that are at least quadratic in the number of notes in a bipartite graph, which make known methods impractical for large and complex datasets. In various embodiments, the approach for maximum cluster matching herein works in a map-reduce context based on the observation that a user typically has relatively few devices, and exceptions like a cluster of devices matched to multiple clusters of devices in a maximum cluster matching process are rare. As a result, the maximum cluster matching approach with such reduced complexity can process a large and complex dataset within a reasonable time.

Various terms are used throughout this description. Although more details regarding various terms are provided throughout this description, general definitions of some terms are included below to provider a clearer understanding of the ideas disclosed herein.

An "identifier" refers to one or more symbols that establish the identity of an entity. An identifier generally differentiates the entity being identified from other entities in the same or similar categories. As an example, letters, numerals, special characters, or a combination of these can be used as identifiers to differentiate one profile from another profile in a system.

A "device identification" refers to an identifier established to identify a device. A device identification may include one or more hardware identifications, such as a universally unique identifier (UUID), a serial number of a hard disk drive (HDD), a combination of multiple hardware identifications, etc. A device identification may also include identifiers that are generated by the system, e.g., cookies, which can be assigned to the device to form at least a part of the device identification.

A "persistent profile identifier" refers to an identifier established to identify a cluster of devices belonging to a profile (e.g., a user, a household, an organization, or another type of entity) over different time periods. Assigning a persistent profile identifier to a cluster of devices may be accomplished by preserving the existing identifier associated with the cluster of devices. It is contemplated that the persistent profile identifier can be generated such that the persistent profile identifier anonymously identifies the user, household, organization, or entity without any personally identifiable information.

In digital marketing, clusters of devices accessing an application or service can be identified in order to make associations between a cluster of devices and a particular user, household, or entity (i.e., a profile). In this regard, when such a profile-cluster association is determined, digital marketing tools can be used to target, measure, and interact with the profile. In conventional implementations of clustering analysis, many existing clustering algorithms, e.g., k-means clustering, are concerned with finding related devices belonging to a common entity in a "snapshot in time", and as such these implementations fail to directly address the issue of generating a persistent identifier for clusters formed at different times over extended periods of time. Additionally, existing clustering solutions are impractical for use with large and complex datasets.

Embodiments of the present disclosure generally relate to generating persistent profile identifiers. In particular, a clustering algorithm can be used to generate persistent profile identifiers for large scale clusters of devices, where the clusters of devices are identified at different times. Even though the device clusters are identified at different times, the respective clusters may share common ownership and the individual devices of each cluster may also change over time. The clusters are associated with identifiers that facilitate comparing the individual devices within each cluster to generate persistent profile identifiers.

As discussed above, traditional clustering algorithms generally are impractical at scale. This disclosure describes a heuristic method for maximum cluster matching; that is able to quickly process a very large dataset. In various embodiments, this heuristic method for maximum cluster matching can work in a map-reduce context, based on the observation that a user typically has relatively few devices, e.g., dozens, hundreds, or thousands at most. Further, there may be few "contentious" overlaps in the graph, a cluster may be matched to multiple clusters and would require one to study the global picture of the graph.

In various embodiments, assigning a persistent profile identifier to a cluster is accomplished by preserving identifiers associated with clusters of devices having device identifications based on identifying matching identifiers between two sets of identifiers that represent the clusters of devices at different times. The first set of identifiers is assigned at a first period of time, and the second set of identifiers is assigned at a second period of time. Comparing the two sets of identifiers to preserve a maximum cluster matching is iteratively performed over periods of time (e.g., from day to day, from week to week, or month to month). A stable identifier is assigned to a set of devices that are likely to belong to the same profile. It is contemplated that such persistent profile identifiers can be anonymous such that they are not linked with personal identifiable information (PII).

With reference now to FIG. 1, an example system configuration for producing and using persistent profile identifiers, in accordance with various embodiments, is illustrated. System 100 includes various user devices of one or more users, which have access via networking to server devices in system 100. As illustrated in FIG. 1, user devices include, e.g., desktop computer 124, mobile computer 126, smartphone 134, and tablet computer 136.

When system 100 is used for digital marketing, a profile in system 100 may refer to an individual customer, a household, an organization, or any entity that can be used for the purpose of digital marketing. As illustrated in FIG. 1, customer 132 is a profile, while household 122 is another profile. In some embodiments, customer 132 uses smartphone 134 or tablet computer 136 to connect to identification server 110 in system 100, and household 122 uses desktop computer 124 or mobile computer 126 to connect to identification server 110 in system 100. In other embodiments, customer 132 and household 122 may use different devices to connect to identification server 110 in system 100. As an example, customer 132 can also use a wearable computer not shown to access identification server 110 in system 100. As another example, smartphone 134 can be brought into household 122, and then household 122 may appear to share smartphone 134 with customer 132 to access identification server 110 in system 100.

User devices can connect to identification server 110 via wired or wireless connections. As will be described in more detail below, a user device provides its identify to identification server 110 or facilitates identification server 110 to identify itself, while identification server 110 can produce persistent profile identifiers for networking devices, e.g., a cluster of devices belonging to a same entity. In one embodiment, identification server 110 identifies cluster 130 to include smartphone 134 and tablet computer 136. Similarly, identification server 110 identifies cluster 120 to include desktop computer 124 and mobile computer 126.

While not illustrated, user devices in system 100 may also include a handheld computer, a laptop, a cellular phone, an audio and/or video player, a gaming device, a video camera, a digital camera, a navigation device, and/or other suitable user electronic devices, which may communicate with identification server 110 and to be identified and assigned with persistent profile identifiers.

Identification server 110 can produce a persistent profile identify to a profile, which can be a cluster of devices that share a common property, e.g., a common ownership or pattern of usage. In various embodiments, identification server 110 can not only perform business logic, but also provide data services related to the business logic.

In respect to business logic, identification server 110 can identify various user devices accessing identification server 110, e.g., mobile computer 126 and smartphone 134. Consequently, identification server 110 can identify a cluster of devices that belong to a same user, e.g., smartphone 134 and tablet computer 136 can form cluster 130 when they are both used by customer 132. As illustrated in FIG. 1, desktop computer 124 and mobile computer 126 can similarly form another cluster 120 as they are both associated with household 122. In some embodiments, identification server 110 will access cluster information, e.g., from another computing device that performs a clustering algorithm.

In various embodiments, identification server 1110 is a server computing device that produces a persistent profile identifier for a profile, e.g., a cluster of devices associated with an entity in a network. A persistent profile identifier can be produced to identify the same profile accessing a network in different time periods, even in some embodiments, the profile membership the composition of a cluster of devices) may change over time.

Identification server 110 includes networking module 112, device identification module 114, profile identification module 116, and data module 118, operatively coupled with each other in one embodiment. Device identification module 114 receives, e.g., via networking module 112, the device identifications associated with a first cluster of devices at the first time period and the device identifications associated with a second cluster of devices at the second time period in some embodiments, time periods may be in homogenous units, such as uniformly a day, a week, or a month. In other embodiments, time periods may be in heterogeneous units, such as one day for one time period, but one week for another time period.

Figure 2:
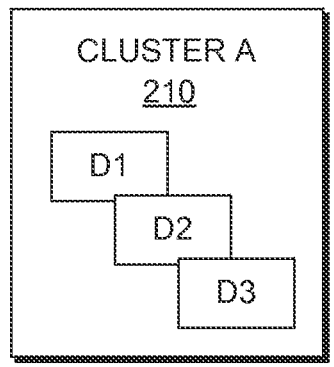
FIG. 2 is a schematic diagram illustrating examples of cluster-formation over time, incorporating aspects of the present disclosure, in accordance with various embodiments.
Figure 2:
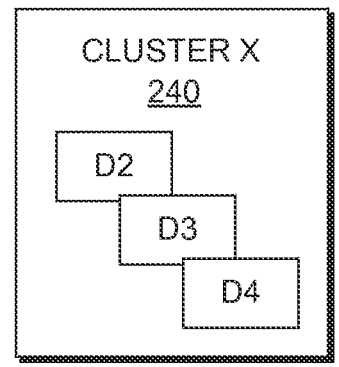

As an example, in connection with FIG. 2, identification server 110 receives device identifications of (D1, D2, and D3) associated with cluster A 114 during week 1 and device identifications of (D2, D3, and D4) associated with cluster X 118 week 2. As another example, in connection with FIG. 5, identification server 110 receives device identifications of (D4, D5, and D6) associated with cluster 514 in a first time period (e.g., a week) and device identifications of (D5 and D6) associated with cluster 524 in a second time period (e.g., a month).

Device identification module 114 generates the first group of identifiers to identify those clusters at the first time period, and similarly generate the second group of identifiers to identify those clusters at the second time period. As an example, in connection with FIG. 5, identification server 110 generates the first group of identifiers (A, B, and C) and the second group of identifiers (X, Y, Z) respectively in different time periods for various clusters of devices or profiles.

Figure 5:
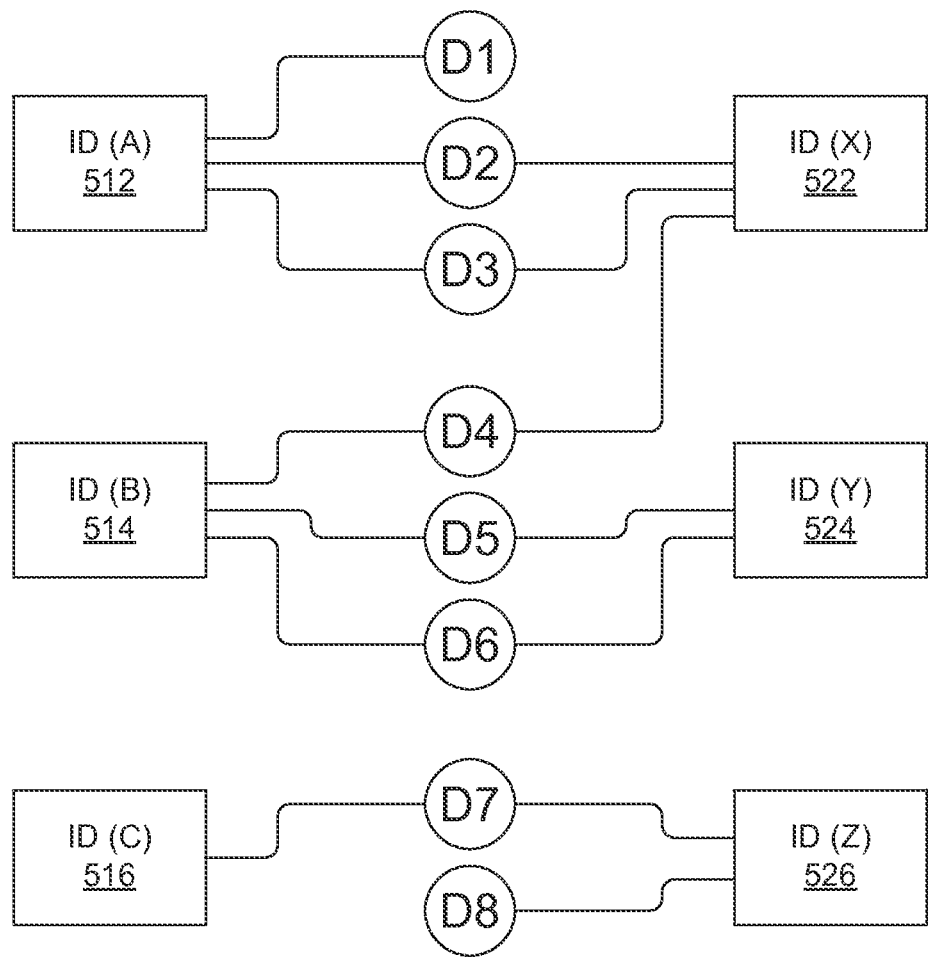
FIG. 5 is a schematic diagram illustrating connections among clusters of devices in one example, in accordance with various embodiments.

Meanwhile, device identification module 114 assigns an identifier to identify a cluster of devices at the first time period, e.g., assign ID (A) to cluster 512; and assign a second identifier to identify a second cluster of devices at the second time period, e.g., assign ID (X) to cluster 522, in connection with FIG. 5. In this case, both ID (A) and ID (X) are considered as anonymous identifications because they carry no PII of the user. By the same token, in connection with FIG. 2, device identification module 114 assigns identifiers of A, B, and C to three clusters respectively in week 1, and assigns identifiers of X, Y, and Z to another three clusters respectively in week 2.

In some embodiments, the device identification of a device may not be intuitively recognizable or may change occasionally. As an example, a media access control (MAC) address may be used as the device identification for a networking device as the MAC address is a unique identifier assigned to network interfaces for communications, and MAC addresses are commonly used as a network address for most IEEE 802 network technologies, including Ethernet and Wi-Fi. However, a modern computer has multiple MAC addresses from multiple network adapters. For instance, mobile computer 126 of FIG. 1 may have three MAC addresses for its Ethernet, Wi-Fi, and Bluetooth adapters.

Therefore, the MAC address of mobile computer 126 can change depending on how it connects to the network. Therefore, device identification module 114 needs to associate one device identification in one time period to a respective one in another time period to track the same device. As an example, device identification module 114 can associate the MAC address of the Wi-Fi adapter in mobile computer 126 with the MAC address of the Ethernet adapter in mobile computer 126, e.g., based on historical data analysis or based on a query to find all MAC addresses of mobile computer 126. Other identifications can also be used as device identification by device identification module 114, e.g., a universally unique identifier (UUID), a serial number of a hard disk drive (HDD), a combination of multiple hardware identifications, etc. Yet in other embodiments, identifiers that are generated by identification server 110, e.g., cookies, can be sent to user devices and passed back to device identification module 114 as a form of device identification.

Profile identification module 116, coupled to networking module 112 and device identification module 114, can access the first group of identifiers, e.g., ID (A), ID (B), and ID (C) used to identify the three clusters in FIG. 5 in the first time period. Similarly, profile identification module 116 can also access the second group of identifiers, e.g., ID (X), ID (Y), and ID (Z) used to identify the other three clusters in FIG. 5 in the second time period.

In some embodiments, profile identification module 116 pairs clusters between the first group of identifiers and the second group of identifiers based on an inner join operation on device identifications associated with the first and second groups of identifiers. In some embodiments, profile identification module 116 may further identify, from the second group of identifiers, a first most frequent identifier that pairs with the first identifier; and then discard those pairs including the first identifier and another identifier that is not the first most frequent identifier from the second group of identifiers.

In some embodiments, profile identification module 116 can further identify, from the first group of identifiers, a second most frequent identifier that pairs with the second identifier; and discard those pairs including the second identifier and another identifier that is not the second most frequent identifier from the first group of identifiers.

Subsequently, profile identification module 116 identifies a pair including the first and second identifiers from the remaining set of pairs. As a result, the first identifier is to be used as the persistent identifier for the first cluster of devices and the second cluster of devices. These and other aspects of the present disclosure related to the pairing and the determination of the maximum cluster matching will be more fully described below, e.g., in connection with FIGS. 2-6.

Data module 118 facilitates device identification module 114 and profile identification module 116 to store, retrieve, or otherwise access the device identifications, the identifiers for clusters, or other information required for producing persistent profile identifications. In some embodiments, data module 118 includes a query engine to a database that contains all data discussed herein.

Networking module 112 can enable identification server 110 to communicate with another computing device, e.g., utilizing one or more wireless or wired networks. These wireless or wired networks may include public and/or private networks, such as, but not limited to, LANs, WANs, or the Internet. In some embodiments, these wireless networks includes one or more WPANs, WLANs, WMANs, or WWANs. In some embodiments, these wireless networks includes cellular networks, for example, Wideband Code Division Multiple Access (WCDMA), Global System for Mobile Communications (GSM), Long Term Evolution (LTE), and the like.

Marketing server 140 or marketing server 150 are representatives of various application servers used for digital marketing. These marketing servers can rely on identification server 110 in system 100 to identify a profile (e.g., a customer, a household, an enterprise, etc.) associated with a set of devices even when different devices may be used and associated with the same profile in different time periods. Thus, marketing server 140 or marketing server 150 can consistently measure, target, and interact with an identified profile pertaining to a targeted marketing strategy, e.g., based on the product, price, promotion, and place associated with a product or service in the marketplace.

In various embodiments, identification server 110 may be implemented differently than depicted in FIG. 1. As an example, device identification module 114 may be combined with profile identification module 116 to form a comprehensive module to produce persistent profile identifications for networking devices. In some embodiments, components depicted in FIG. 1 may have a direct or indirect connection not shown in FIG. 1. In some embodiments, some of the components depicted in FIG. 1 may be divided into multiple modules, with each module to perform more specific functions.

One or more components of identification server 110 may be located across any number of different devices or networks. As an example, data module 118 may be implemented as an integrated subsystem of a data server rather than located in identification server 110.

Referring now to FIG. 2, examples of cluster-formation over time are illustrated. In one embodiment, identification server 110 in FIG. 1 accesses a group of identifiers for identifying respective clusters of devices at one time period, such as in week 1. Similarly, identification server 110 also can access another group of identifiers for identifying respective clusters of devices at another time period, such as in week 2.

Various clusters may be formed in different time periods, in week 1, cluster A 210 includes devices D1, D2, and D3; cluster B 220 includes devices D4, D5, and D6; and cluster C 230 includes devices D7. In week 2, cluster X 240 includes devices D2, D3, and D4; cluster Y 250 includes devices D5 and D6; and cluster Z 260 includes devices D7 and D8.

The clusters week 1 can be connected the clusters in week 2 based on their shared devices. As an example, such connections in FIG. 2 are shown in FIG. 5. Referring now to FIG. 5, cluster 512 is connected to cluster 522 based on their shared devices D2 and D3. Cluster 514 is connected to cluster 524 based on their shared devices D5 and D6. Cluster 514 is also connected to cluster 522 based on their shared device D4. Finally, cluster 516 is connected to cluster 526 based on their shared device D7.

Identification server 110 can determine that a first cluster of devices identified in week 1 and a second cluster of devices identified in week 2 form an edge in a maximum cluster matching based on their shared devices. Therefore, identification server 110 can provide the identifier used for the first cluster of devices as a persistent identifier for the second cluster of devices. In this way, marketing server 140 or 150 can keep on targeting, measuring, or interacting with the same profile over time.

Various entities in FIG. 2 form a bipartite graph, which can be more intuitively observed in FIG. 5. A "matching" in a bipartite graph is a set of the edges chosen in such a way that no two edges share an endpoint. A maximum matching is a matching of maximum size, e.g., maximum number of edges. In a weighted bipartite graph, each edge has an associated value. A maximum weighted bipartite matching refers to a matching where the sum of the values of the edges in the matching has a maximal value.

When viewing two clusters of devices in different periods, as illustrated in FIG. 2 or FIG. 5, the number of their shared devices between the two clusters may be construed as the weight between these two clusters of devices. A maximum weighted bipartite matching for clusters of devices in two periods (also simply referred as "maximum cluster matching" herein) refers to a matching where the sum of shared devices in the matching has a maximal value. In various embodiments, a persistent profile identifier may be found based on the maximum cluster matching.

Profile identification module 116 in FIG. 1 can determine a maximum cluster matching including the edge between one cluster of devices, e.g., cluster 512 and another cluster of devices, e.g., cluster 522, based at least in part on a group of pairs of identifiers generated from the first group of identifiers (A, B, and C) and the second group of identifiers (X, Y, Z). In some embodiments, a pair of identifiers is formed when the two clusters share a common device. As an example, two pairs of identifiers are formed between clusters 512 and 522, i.e., (A, X) and (A, X), since cluster A and cluster X share two common devices D2 and D3. Further aspects of the pairing and the determination of the maximum cluster matching will be more fully described below, e.g., in connection with FIGS. 3-4.

Figure 3:
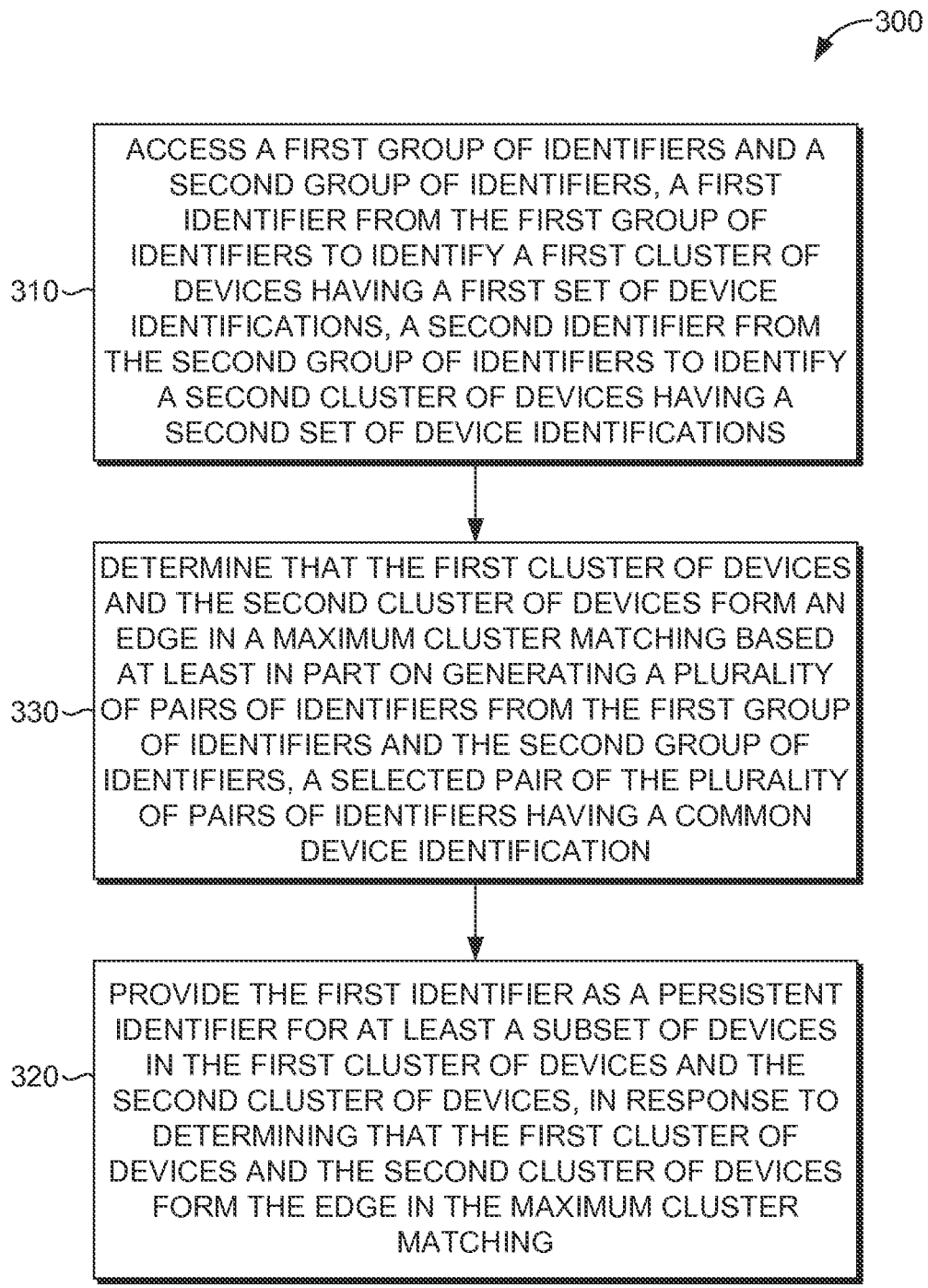
FIG. 3 is a flow diagram of an example process for producing persistent profile identifiers, which may be practiced by an example apparatus, incorporating aspects of the present disclosure, in accordance with various embodiments.

FIG. 3, provides a flow diagram of an example process 300 for producing persistent profile identifiers, which may be practiced by an example apparatus in accordance with various embodiments. Process 300 may be performed by processing logic that comprises hardware (e.g., circuitry, dedicated logic, programmable logic, microcode, etc.), software (e.g., instructions run on a processing device to perform hardware simulation), or a combination thereof. The processing logic can produce persistent profile identifiers. As such, process 300 may be performed by a computing device, e.g., identification server 110, to implement one or more embodiments of the present disclosure. In various embodiments, process 300 may have fewer or additional operations, or perform some of the operations in different orders.

A process to produce persistent profile identifiers, in one embodiment, may start by creating random globally unique identifiers for all the detected clusters in the first run of clustering. For a subsequent run of clustering, one can find a maximum cluster matching between the previously created globally unique identifiers and the presently created globally unique identifiers. So that, the matched identifier from the previous run can be used to replace the identifier created in the subsequent run, thus keeping most identifiers in fact stable in time.

In various embodiments, process 300 begins at block 310, where a computing device, e.g., identification server 110 of FIG. 2, accesses a first group of identifiers, e.g., from a previous run of clustering, and a second group of identifiers, e.g., from the present run of clustering. Identification server 110 uses a first identifier from the first group of identifiers to identify a first cluster of devices including a first set of device identifications. Identification server 110 uses a second identifier from the second group of identifiers to identify a second cluster of devices including a second set of device identifications.

As an example, in connection with FIG. 5, the first group of identifiers, IDs (A, B, and C), is used to respectively identify the three clusters last week, namely clusters 512, 514, and 516. Similarly, the second group of identifiers, IDs (X, Y, and Z), is used to respectively identify the three clusters this week, i.e., clusters 522, 524, and 526. Further, identification server 110, as an example, can read the links between a cluster and its associated device identifications, such as (A, D1), (A, D2), (A, D3), (B, D4), (B, D5), (B, D6), (C, D7), and (C, D8) from last week, and (X, D2), (X, D3), (X, D4), (Y, D5), (Y, D6), (Z, D7), and (Z, D8) from this week. If necessary, device identifications may be transformed so that identical devices can use a common ID from time to time. Thus, identification server 110 will, in some embodiments, transform or associate one or more identifications from the second set of device identifications to respective ones in the first set of device identifications.

In some embodiments, identification server 110 first generates the first group of identifiers at the first time period, e.g., last week, and assign respective identifiers from the first group of identifiers to respective clusters, e.g., assigning ID (A) to cluster 512. In some embodiments, identification server 110 generates the second group of identifiers at the second time period, e.g., this week, and assign respective identifiers from the second group of identifiers to respective clusters, e.g., assigning ID (X) to cluster 522.

Next, at block 320, identification server 110 determines that the first cluster of devices identified by the first identifier and the second cluster of devices identified by the second identifier forms an edge in a maximum cluster matching based at least in part on generating a group of pairs from the first group of identifiers and the second group of identifiers. In various embodiments, a selected pair of the group of pairs shares at least one common device identification. In some embodiments, the group of pairs can be generated by conducting an inner join operation on device identifications associated with the first group of identifiers and the second groups of identifiers. These and other aspects of the present disclosure related to the pairing and the determination of the maximum cluster matching will be more fully described below, e.g., in connection with FIG. 4.

Next, at block 330, identification server 110 provides the first identifier as a persistent identifier for the first cluster of devices and the second cluster of devices in response to determining a maximum cluster matching including the edge between the first cluster of devices and the second cluster of devices. In various embodiments, one and only one pair remaining in this process will include both the identifier for the first cluster of devices and the identifier for the second cluster of devices. As an example, in connection with FIG. 5, the remaining pairs include (X, A), (Y, B), and (Z, C). Thus, the identifier of A will be preserved as the persistent profile identifier for cluster 522, by the same token, B for Y and C for Z. In this case, all three identifiers (A, B, and C) will be preserved for their respective matching clusters. In other embodiments, brand new clusters may emerge that cannot be matched with an identifier from the previous run of clustering. If that happens, the newly generated identifiers for those newly emerged clusters will be preserved without any replacement.

Figure 4:
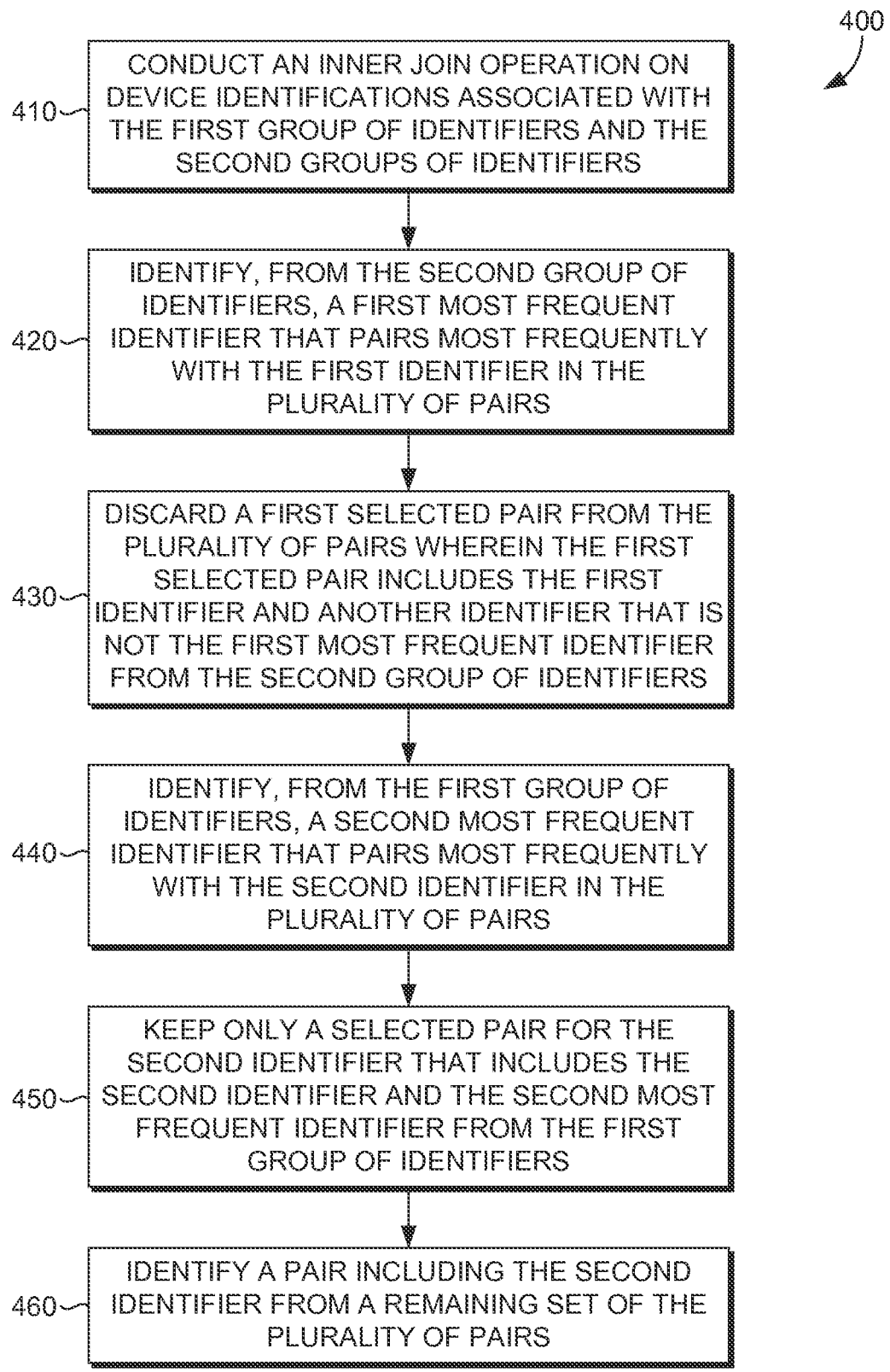
FIG. 4 is a flow diagram of an example process for determining a maximum cluster match, which may be practiced by an example apparatus, incorporating aspects of the present disclosure, in accordance with various embodiments.

Referring now to FIG. 4, it is a flow diagram of an example process 400 for determining a maximum match, which may be practiced by an example apparatus in accordance with various embodiments. As shown, process 400 may be performed by identification server 110 of FIG. 1 to implement one or more embodiments of the present disclosure. In some embodiments, process 400 is to be performed in reference to block 320 in FIG. 3. In various embodiments, various blocks in FIG. 4 may be combined or arranged in any suitable order, e.g., according to the particular embodiment of identification server 110 for producing persistent profile identifications.

FIG. 5 illustrates example connections among clusters of devices in two time periods. In this embodiment, the first group of identifiers, IDs (A, B, and C), is used to respectively identify the three clusters, namely clusters 512, 514, and 516, in a first time period, e.g., last week. Cluster 512 has devices D1, D2, and D3. Cluster 514 has devices D4, D5, and D6. Cluster 516 has device D7. Similarly, the second group of identifiers, IDs (X, Y, and Z), is used to respectively identify the three clusters (i.e., clusters 522, 524, and 526) in a second time period, e.g., this week. Cluster 522 has devices D2, D3, and D4. Cluster 524 has devices D5 and D6. Cluster 526 has devices D7 and D8. This example assignment of cluster identifications in FIG. 5 will be used during the discussion of process 400 of FIG. 4.

Referring now back to FIG. 4, in various embodiments, process 400 begins at block 410, where a computing device, e.g., identification server 110 of FIG. 1, can conduct an inner join operation on device identifications associated with the first group of identifiers and the second groups of identifiers. As an example, in connection with FIG. 5, after performing an inner join on the device identification, it yields a set of mappings between the cluster identifications last week and the cluster identifications this week. For instance, the inner join of [(A, D1), (A, D2), (A, D3), (B, D4), (B, D5), (B, D6), (C, D7))] from last week and [(X, D2), (X, D3), (X, D4), (Y, D5), (Y, D6), (Z, D7), (Z, D8)] from this week will yield [(A, X), (A, X), (B, X), (B, Y), (B, Y), (C, Z)], wherein every pair represents two clusters if they share a unique device.

Process 400 may continue at block 420, where identification server 110 identifies, from the second group of identifiers, a first most frequent identifier that pairs most frequently with the first identifier in the plurality of pairs. In various embodiments, block 420 includes grouping the pairs generated previously based on the first group of identifiers, i.e., (A, B, C). As an example, such grouping from [(A, X), (A, X), (B, X), (B, Y), (B, Y), (C, Z)] will yield [(A, (X, X)); (B, (X, Y, Y); (C, (Z))]. After this grouping, it can be determined that the most frequent identifier paring with A is X, with B is Y, and with C is Z, in this case.

Next, process 400 may continue to block 430, where identification server 110 discards a first selected pair from the plurality of pairs wherein the first selected pair includes the first identifier and another identifier that is not the first most frequent identifier from the second group of identifiers. Continuing the previous discussed example, in view of the most frequent pairs of [(A, X), (B, Y), (C, Z)], the only pair that will be discarded from [(A, X), (A, X), (B, X), (B, Y), (B, Y), (C, Z)] is (B, X) because X is not the most frequent identifier paired with B. As a result, it yields [(A, X), (A, X), (B, Y), (B, Y), (C, Z)].

Next, process 400 may continue to block 440, where identification server 110 identifies, from the first group of identifiers, a second most frequent identifier that pairs most frequently with the second identifier in the plurality of pairs. In some embodiments, the previously generated pairs will reverse their positions, e.g., transforming (old ID, new ID) to (new ID, old ID). Thus, [(A, X), (A, X), (B, Y), (B, Y), (C, Z)] will be transformed to [(X, A), (X, A), (Y, B), (Y, B), (Z, C)]. In some embodiments, the resulting pairs will be grouped based on the second group of identifiers, i.e., (X, Y, Z). Such grouping, in this case, will yield [(X, (A, A)); (Y, (B, B)); (Z, (C))].

Next, process 400 may continue to block 450, where identification server 110 will only keep the most frequent "old cluster ID" from the first group of identifiers for each "new cluster ID" from the second group of identifiers. Continuing with the previous example, [(X, (A, A)); (Y, (B, B)); (Z, (C))] will yield [(X, A), (Y, B), (Z, C)].

Next, process 400 may continue to block 460, where identification server 110 identifies the most frequent "old cluster ID" from the first group of identifiers that pairs with each "new cluster ID" from the second group of identifiers as respective persistent profile identifiers to replace respective "new cluster ID" from the second group of identifiers. Continuing with the previous example, once X is replaced by A, Y is replaced by B, and Z is replaced by C, the final cluster assignment will yield as [(A, D2), (A, D3), (A, D4), (B, D5), (B, D6), (C, D7), (C, D8)] for this week. In this case, all cluster identifiers will be replaced by persistent profile identifiers. In other embodiments, if one or more new cluster identifiers cannot be matched with any old cluster identifiers, those new cluster identifiers will be retained and added to the group of persistent profile identifiers for the next run of clustering.

Figure 6:
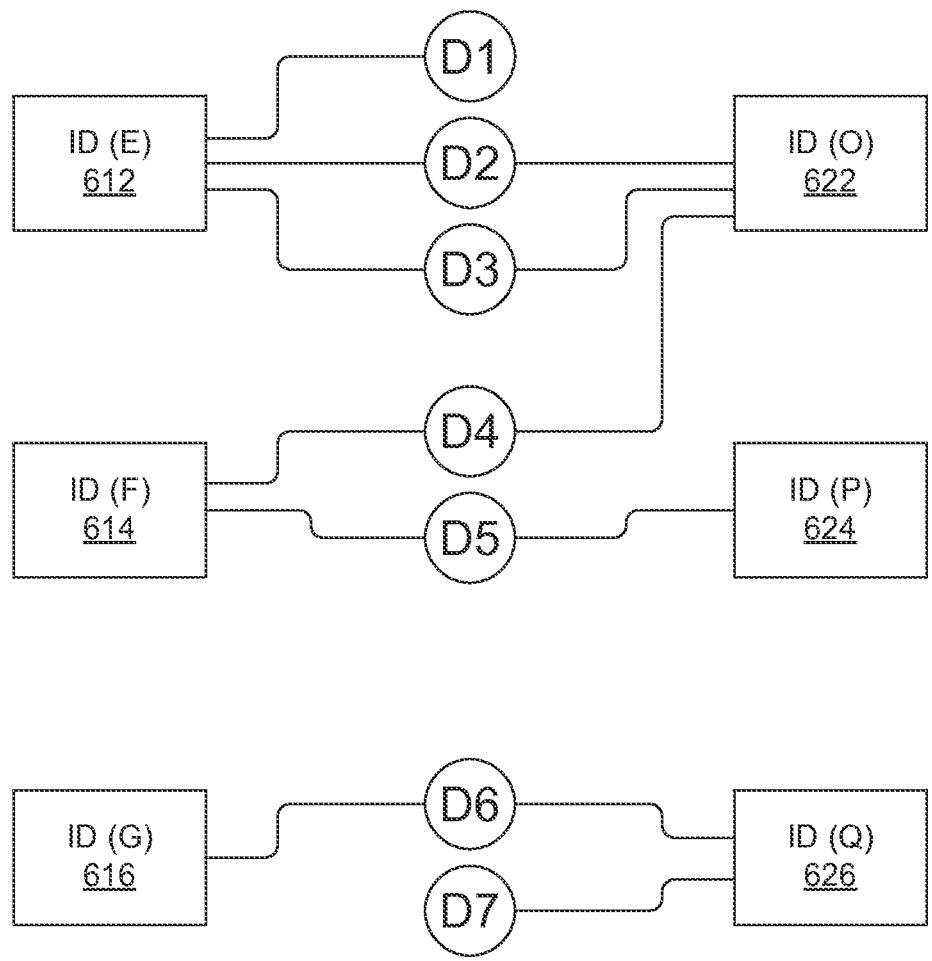
FIG. 6 is a schematic diagram illustrating example connections among clusters of devices in another example, in accordance with various embodiments.

FIG. 6 illustrates connections among clusters of devices in two time periods. In this embodiment, the first group of identifiers, IDs (E, F, and G), is used to respectively identify the three clusters last week, namely clusters 612, 614, and 616. Cluster 612 has devices D1, D2, and D3. Cluster 614 has devices D4 and D5, Cluster 616 has device D6. Similarly, the second group of identifiers, IDs (O, P, and Q), will be used to respectively identify the three clusters this week, namely, clusters 622, 624, and 626. Cluster 622 has devices D2, D3, and D4. Cluster 624 has device D5. Cluster 626 has devices D6 and D7.

This example assignment of cluster identifications in FIG. 6 will now be discussed in connection with process 400 of FIG. 4. After block 410, the inner join will yield a set of mappings between the cluster identifications last week and the cluster identifications this week. For instance, the inner join of [(E, D1), (E, D2), (E, D3), (F, D4), (F, D5), (G, D6)] from last week and [(O, D2), (O, D3), (O, D4), (P, D5), (Q, D6), (Q, D7)] from this week will yield [(E, O), (E, O), (F, O), (F, P), (G, Q)], wherein every pair represents two clusters if they share a unique device.

At block 420, after grouping the pairs generated previously based on the first group of identifiers, i.e., (E, F, G), it yields [(E, (O, O)); (F, (O, P); (G, (Q))]. After this grouping, it appears that either O or P may be the most frequent identifier paired with F because O and P appear to be equally weighted here. Assuming a random identifier from O and P is to be selected as the pseudo most frequent identifier paired with F, e.g., O is to be selected.

At block 430, in view of the most frequent pairs of [(E, O), (F, O), (G, Q)], the only pair will be discarded from [(E, O), (E, O), (F, O), (F, P), (O, Q)], is (F, P) because P is not considered as the most frequent identifier paired with F. As a result, it yields [(E, O), (F, O), (F, O), (G, Q)].

At block 440, these pairs will be transformed and grouped by the second group of identifiers, i.e., (O, P, and Q), which yields [(O, (E, E, F)); (Q, (G))]. After this grouping, it can be determined that the most frequent identifier paring with O is E and with Q is G.

At block 450, after keeping only those frequent pairs from [(O, (E, E, F)); (Q, (G))], it will yield [(O, E), (Q, G)].

At block 460, it can be identified that identifier O will be replaced by identifier E, while identifier Q will be replaced by identifier G this week. If identifiers O and Q are replaced by E and G respectively, the final cluster assignment will yield as [(F, D2), (E, D3), (E, D4), (P, D5), (G, D6), (G, D7)] for this week. Admittedly, it may not be the perfect solution, but not bad either. If there are sufficient resources, this imperfect solution can be further improved by iterating process 400 of FIG. 4.

In some embodiments, after block 460, all new cluster identifiers from the second group of identifiers this week may have been replaced with old cluster identifiers from the second group of identifiers last week. If that is the case, process 400 will not need to be run again. However, in other embodiments, there may be one or more new cluster identifiers from the second group of identifiers this week that have not been replaced with old cluster identifiers from the second group of identifiers last week, such as what has been illustrated above in connection with FIG. 6. In such cases, the output from block 460 can be input to block 410 again.

In this example, at block 410, the inner join of [(E, D1), (E, D2), (E, D3), (F, D4), (F, D5), (G, D6)] from last week and [(E, D2), (E, D3), (E, D4), (P, D5), (G, D6), (G, D7)] from this week will yield [(E, E), (E, E), (F, E), (F, P), (G, G)]. At block 420, grouping yields [(E, (E, E)); (F, (E, P); (G, (G))). Because identifier E and F are from the same group of identifiers last week, identifier F, this time, will select identifier P as its most frequent paired identifier from the second group of identifiers this week. Therefore, after this run of process 400, the eventual cluster assignment will yield as [(E, D2), (E, D3), (E, D4), (F, D5), (G, D6), (G, D7)] for this week, which preserves all persistent profile identifiers again in this case.

Figure 7:
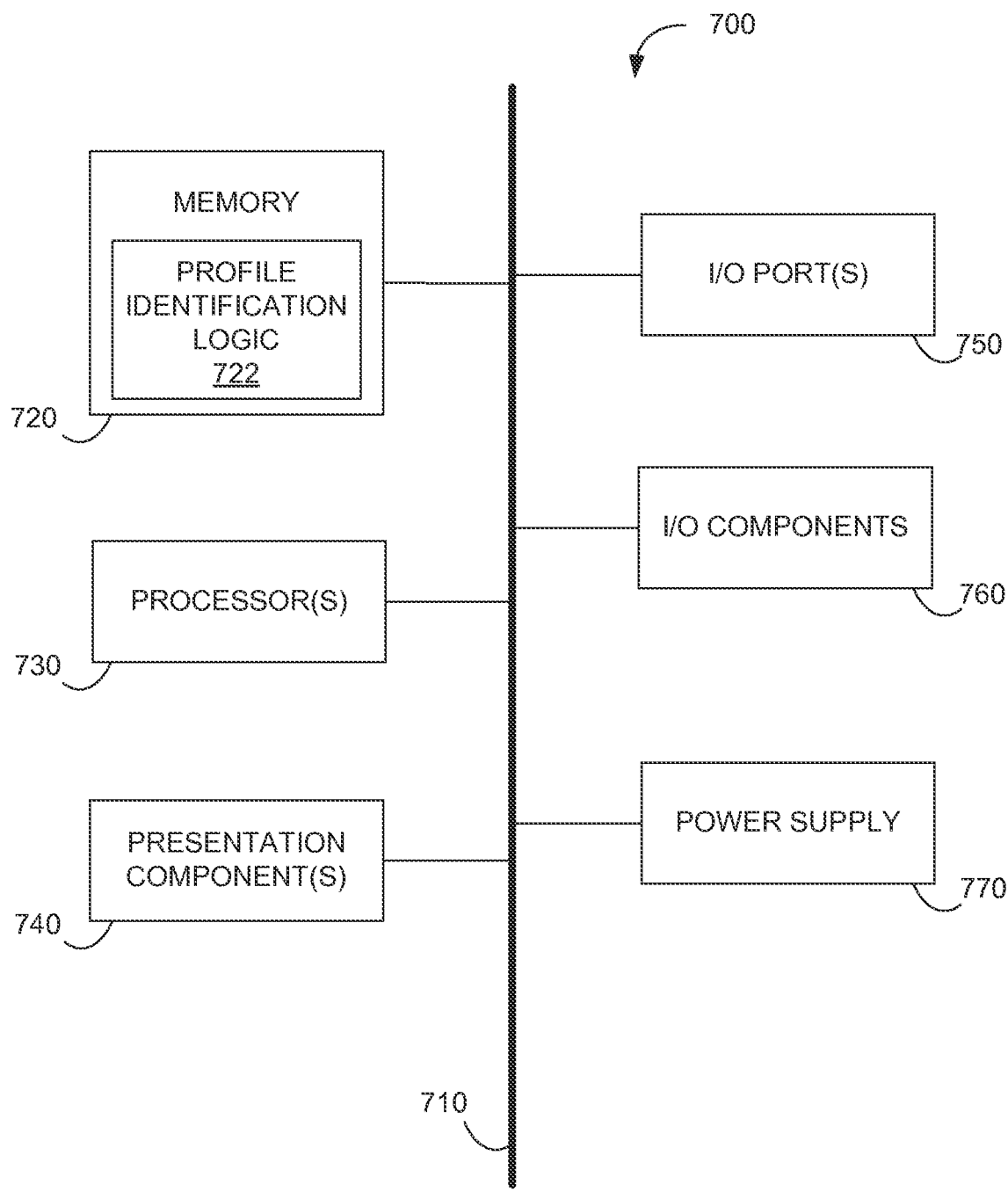
FIG. 7 illustrates an example computing device suitable for practicing the disclosed embodiments, in accordance with various embodiments.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 510 that directly or indirectly couples the following devices: memory 720, one or more processors 730, one or more presentation components 740, input/output (I/O) ports 750, input/output components 760, and an illustrative power supply 770. Bus 510 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fizzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media, Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 720 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 720 or I/O components 760. Presentation component(s) 740 present data indications to a user or other device. Exemplary presentation components include a display device, speaker, printing component, vibrating component, etc.

In various embodiments, memory 720 includes, in particular, temporal and persistent copies of profile identification logic 722. Profile identification logic 722 includes instructions that, when executed by one or more processors 730, result in computing device 700 producing persistent profile identifiers, such as, but not limited to, process 300 or process 400. In various embodiments, profile identification logic 722 includes instructions that, when executed by processor 710, result in computing device 700 performing various functions associated with, such as, but not limited to, device identification module 114, profile identification module 116, networking module 112, and data module 118, in connection with FIG. 1.

In some embodiments, one or more processors 730 may be packaged together with profile identification logic 732. In some embodiments, one or more processors 730 may be packaged together with profile identification logic 722 to form a System in Package (SiP). In some embodiments, one or more processors 730 may be integrated on the same die with profile identification logic 732. In some embodiments, processor 710 may be integrated on the same die with profile identification logic 732 to form a System on Chip (SoC).

I/O ports 750 allow computing device 700 to be logically coupled to other devices including I/O components 760, some of which may be built in. Illustrative components include a microphone, joystick, game pad, satellite dish, scanner, printer, wireless device, etc. The I/O components 760 may provide a natural user interface (NUI) that processes air gestures, voice, or other physiological inputs generated by a user. In some embodiments, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Figure 8:
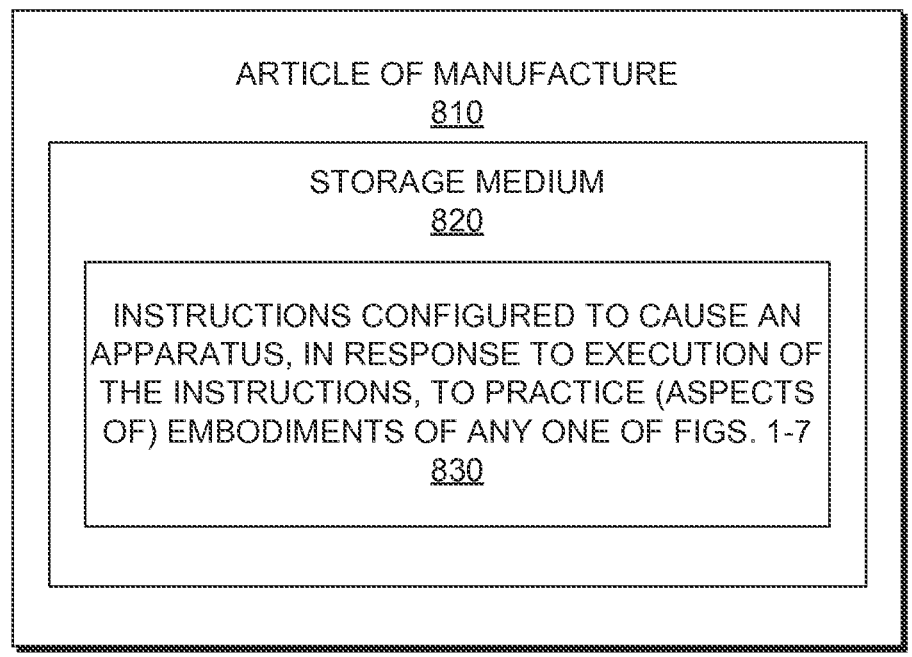
FIG. 8 illustrates an article of manufacture having programming instructions, incorporating aspects of the present disclosure, accordance with various embodiments.

FIG. 8 illustrates an article of manufacture 810 having programming instructions, incorporating aspects of the present disclosure, in accordance with various embodiments. In various embodiments, an article of manufacture may be employed to implement various embodiments of the present disclosure. As shown, the article of manufacture 810 includes a computer-readable non-transitory storage medium 820 where instructions 830 are configured to practice embodiments of or aspects of embodiments of any one of the processes described herein. The storage medium 820 represents a broad range of persistent storage media known in the art, including but not limited to flash memory, dynamic random access memory, static random access memory, an optical disk, a magnetic disk, etc. Instructions 830 can enable an apparatus, in response to their execution by the apparatus, to perform various operations described herein. For example, storage medium 820 includes instructions 830 configured to cause an apparatus, e.g., identification server 110 of FIG. 1, to practice some or all aspects of producing persistent profile identifiers, as illustrated in process 300 of FIG. 3, process 400 of FIG. 4, or aspects of embodiments of any one of the figures disclosed herein. In various embodiments, computer-readable storage medium 820 may include one or more computer-readable non-transitory storage media. In other embodiments, computer-readable storage medium 820 may be transitory, such as signals, encoded with instructions 830.

As can be understood, embodiments of the present invention provide for, among other things, facilitating generation of persistent profile identifiers. The present invention has been described in relation to particular embodiments, which are intended in all respects to be illustrative rather than restrictive. Alternative embodiments will become apparent to those of ordinary skill in the art to which the present invention pertains without departing from its scope.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

In the detailed description, reference is made to the accompanying drawings, which form a part hereof, wherein like numerals designate like parts throughout, and in which is shown, by way of illustration, embodiments that may be practiced. It is contemplated that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Although the terms "step" and/or "block" may be used herein to connote different elements of methods employed, the terms should not be interpreted as implying any particular order among or between various steps herein disclosed unless and except when the order of individual steps is explicitly described. Further, various operations may be described as multiple discrete actions or operations in turn, in a manner that is most helpful in understanding the claimed subject matter. However, various additional operations may be performed, and/or described operations may be omitted or combined in other embodiments.

For the purposes of the present disclosure, the phrase "A and/or B" means (A), (B), or (A and B). For the purposes of the present disclosure, the phrase "A, B, and/or C" means (A), (B), (C), (A and B), (A and C) (B and C) or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in various embodiments," or the like, which may each refer to one or more of the same or different embodiments. Furthermore, the terms "comprising," "including," "having," and the like, as used with respect to embodiments of the present disclosure, are synonymous.

In various embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In various embodiments, a module may be implemented in firmware, hardware, software, or any combination of firmware, hardware, and software.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A computer-implemented method for providing persistent identifiers, comprising:
   accessing, by a first server, a first group of identifiers and a second group of identifiers, a first identifier from the first group of identifiers identifies a first cluster of devices having a first set of device identifications, a second identifier from the second group of identifiers identifies a second cluster of devices having a second set of device identifications;
   determining, by the first server, that the first cluster of devices and the second cluster of devices form an edge in a maximum cluster matching based at least in part on generating a plurality of pairs of identifiers from the first group of identifiers and the second group of identifiers;
   in response to determining that the first cluster of devices and the second cluster of devices form the edge in the maximum cluster matching, generating, by the first server, a persistent identifier based on the first identifier for a subset devices in the first cluster of devices and the second cluster of devices; and
   providing the persistent identifier, by the first server to a second server to interact with the subset devices based on the persistent identifier.

2. The method of claim 1, further comprising:
   generating the first group of identifiers at a first time period;
   assigning the first identifier from the first group of identifiers to the first cluster of devices;
   generating the second group of identifiers at a second time period; and
   assigning the second identifier from the second group of identifiers to the second cluster of devices.

3. The method of claim 1, wherein the generating the plurality of pairs of identifiers further comprises conducting an inner join operation on the first set of device identifications and the second set of device identification associated with the first group of identifiers and the second groups of identifiers respectively.

4. The method of claim 3, wherein the determining further comprises identifying, from the second group of identifiers, a first most frequent identifier that pairs most frequently with the first identifier in the plurality of pairs.

5. The method of claim 4, wherein the determining further comprises discarding at least one selected pair from the plurality of pairs of identifiers, wherein the at least one selected pair includes the first identifier and another identifier that is not the first most frequent identifier from the second group of identifiers.

6. The method of claim 5, wherein the determining further comprises identifying, from the first group of identifiers, a second most frequent identifier that pairs most frequently with the second identifier in the plurality of pairs.

7. The method of claim 6, wherein the determining further comprises keeping only a selected pair for the second identifier that includes the second identifier and the second most frequent identifier from the first group of identifiers.

8. The method of claim 7, wherein the determining further comprises identifying a pair including the second identifier from a remaining set of the plurality of pairs.

9. The method of claim 8, wherein the determining further comprises maximizing a sum of shared devices among the remaining set of the plurality of pairs in the maximum cluster matching.

10. An apparatus for providing persistent identifiers, comprising:
a networking module to receive a first plurality of device identifications associated with a first cluster of devices at a first time period and a second plurality of device identifications associated with a second cluster of devices at a second time period; and
a profile identification module, coupled to the networking module, to assign a first identifier from a first group of identifiers to identify the first cluster of devices, a second identifier from a second group of identifiers to identify the second cluster of devices; and to generate a persistent identifier for a subset devices in the first cluster of devices and the second cluster of devices in response to determining that the first cluster of devices and the second cluster of devices form an edge in a maximum cluster matching based at least in part on a plurality of pairs generated from the first group of identifiers and the second group of identifiers.

11. The apparatus of claim 10, further comprising:
a device identification module, coupled to the networking module, to assign the first identifier to identify the first cluster of devices at the first time period; assign the second identifier to identify the second cluster of devices at the second time period; and associate one or more device identifications from the second plurality of device identifications to respective ones from the first plurality of device identifications; and
a data module, coupled to the device identification module and the profile identification module, to store or retrieve the first and second plurality of device identifications and the first and second group of identifiers.

12. The apparatus of claim 11, wherein the device identification module is further to generate the first group of identifiers at the first time period, and to generate the second group of identifiers at the second time period.

13. The apparatus of claim 10, wherein the profile identification module is further to generate the plurality of pairs between the first group of identifiers and the second group of identifiers based on an inner join operation on device identifications associated with the first and second groups of identifiers.

14. The apparatus of claim 13, wherein the profile identification module is further to identify, from the second group of identifiers, a first most frequent identifier that pairs with the first identifier in the plurality of pairs; and wherein the profile identification module is further to discard a first selected pair from the plurality of pairs when the first selected pair includes the first identifier and another identifier that is not the first most frequent identifier from the second group of identifiers.

15. The apparatus of claim 14, wherein the profile identification module is further to identify, from the first group of identifiers, a second most frequent identifier that pairs with the second identifier; and wherein the profile identification module is further to keep only a selected pair for the second identifier that includes the second identifier and the second most frequent identifier from the first group of identifiers.

16. The apparatus of claim 15, wherein the profile identification module is further to identify a pair including the first and second identifiers from a remaining set of the plurality of pairs, and to provide the first identifier as the persistent identifier.

17. One or more non-transitory computer storage media storing computer-useable instructions that, when used by one or more computing devices, cause the one or more computing devices to perform operations, comprising:
accessing a first group of identifiers and a second group of identifiers, a first identifier from the first group of identifiers to identify a first cluster of devices including a first set of device identifications, a second identifier from the second group of identifiers to identify a second cluster of devices including a second set of device identifications;
determining that the first cluster of devices and the second cluster of devices form an edge in a maximum cluster matching based at least in part on a plurality of pairs generated from the first group of identifiers and the second group of identifiers; and
in response to determining that the first cluster of devices and the second cluster of devices form the edge in the maximum cluster matching, generating a persistent identifier for a subset devices from the first cluster of devices and the second cluster of devices.

18. The one or more non-transitory computer storage media of claim 17, wherein the determining comprises:
conducting an inner join operation on device identifications associated with the first group, of identifiers and the second groups of identifiers to generate the plurality of pairs.

19. The one or more non-transitory computer storage media of claim 18, wherein the determining comprises:
identifying, from the second group of identifiers, a first most frequent identifier that pairs most frequently with the first identifier in the plurality of pairs;
discarding a first selected pair from the plurality of pairs wherein the first selected pair includes the first identifier and a third identifier that is not the first most frequent identifier from the second group of identifiers;
identifying, from the first group of identifiers, a second most frequent identifier that pairs most frequently with the second identifier in the plurality of pairs; and
keeping only a second selected pair for the second identifier that includes the second identifier and the second most frequent identifier from the first group of identifiers.

20. The one or more non-transitory computer storage media of claim 19, wherein the determining further comprises identifying a pair including the first and second identifier from a remaining set of the plurality of pairs.

\* \* \* \* \*